United States Patent [19]

Bannon

[11] 4,308,130
[45] Dec. 29, 1981

[54] CRUDE OIL DISTILLATION

[75] Inventor: Robert P. Bannon, Houston, Tex.

[73] Assignee: Shell Oil Company, Houston, Tex.

[21] Appl. No.: 154,696

[22] Filed: May 30, 1980

[51] Int. Cl.³ .......................... C10G 7/00; B01D 3/16
[52] U.S. Cl. ................................... 208/352; 208/355;
208/358
[58] Field of Search ............... 208/352, 355, 358, 361

[56] References Cited

U.S. PATENT DOCUMENTS

| 2,323,047 | 6/1943 | Jewell | 208/358 |
| 2,327,534 | 8/1943 | Lambert | 208/355 |
| 3,297,566 | 1/1967 | Moyer | 208/355 |

Primary Examiner—T. M. Tufariello

[57] ABSTRACT

A novel crude oil fractional distillation process, characterized by improved regulation of reflux in the de-entrainment section of a fractional distillation column, is disclosed.

8 Claims, 2 Drawing Figures

CRUDE OIL DISTILLATION

BACKGROUND OF THE INVENTION

The invention relates to an improvement in the distillation of crude oil.

Briefly, the distillation of crude oil is normally carried out in multiple stage fractional distillation columns having a number of side raw product streams. In such columns, the liquid is vaporized or flashed in a lower flash zone, and flash vapor is fractionated in the upper portion of the column. The section of trays between the flash zone and the lowest sidedraw is called the de-entrainment section. The primary function of the de-entrainment section is to remove drops of liquid entrained in the vapor leaving the flash zone. Liquid from the bottom tray of the de-entrainment section, the distillate portion of which is sometimes called overflash, is either drained to the flash zone or recycled back to the crude heater.

The process designer is faced with two conflicting design requirements for the de-entrainment section. First, there must be sufficient reflux liquid on the trays to obtain effective contacting of liquid and vapor, and consequent removal of black oil drops entrained from the flash zone, and, second, for maximum distillate yield and thermal efficiency, overflash should be as low as possible. In the typical design, a compromise must be made between these two requirements. Accordingly, a need has existed for an improved process for distillation of crude oil which overcomes these limitations. The invention is such a process.

SUMMARY OF THE INVENTION

Briefly, then, the invention relates to a process for the fractional distillation of crude oil wherein the crude oil is vaporized or flashed in the lower or flash zone of a multiple tray fractional distillation column to produce a vapor which is fractionated in the upper or condenser sections of the column. In particular, the invention provides for the removal of liquid from the tray just above the flash zone and return of the liquid to the column at a zone or location higher than said tray, but below the lowest sidedraw tray, preferably at least 2 trays above the point of removal. Concomitantly, liquid is removed from the same tray (the first tray above the flash zone) and returned to the flash zone or to the feedstock entry. Ideally, this liquid is simply purged from the line containing liquid for return higher in the column. The term "tray", as used herein, includes bubble cap, valve type, or perforated plate trays, or modifications thereof, as well as equivalent structures. Again, the term "column" is understood to include one structure, or two or more such units in series, the designations of "higher" and "upper" merely referring to cooler temperature areas of such unit or units.

In a preferred embodiment of the invention, the flow of recirculated de-entrainment liquid is held constant at a rate that results in good vapor/liquid contacting on the trays in the circulation loop, the purge liquid flow is controlled in response to the level of liquid on the tray just above the flash zone of the column, and the supply of liquid to the circulation loop is controlled to provide a sufficient purge flow to maintain the concentration of de-entrained black oil at an acceptable level.

DETAILED DESCRIPTION OF THE INVENTION

Figure 1:
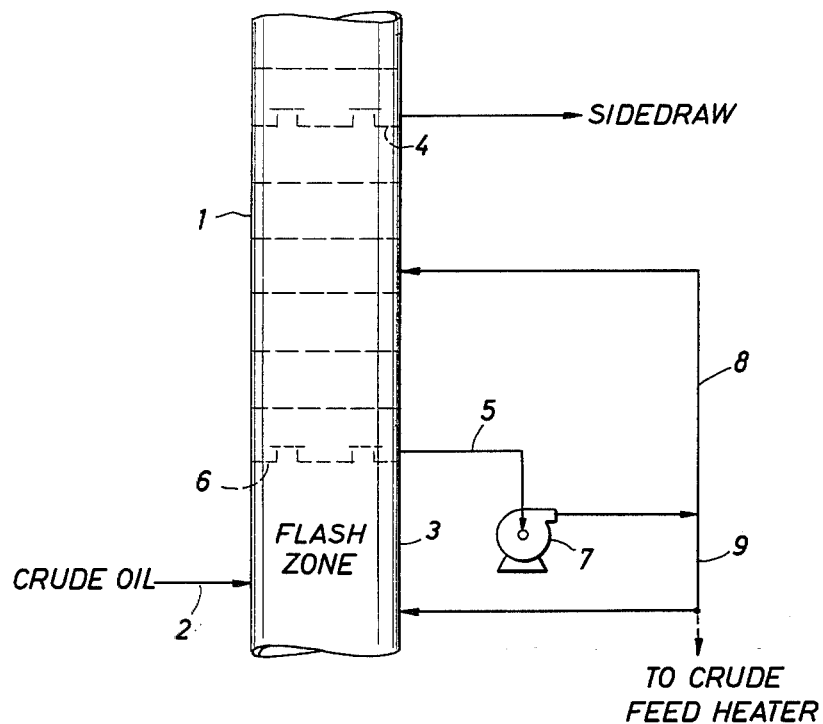
Figure 2:
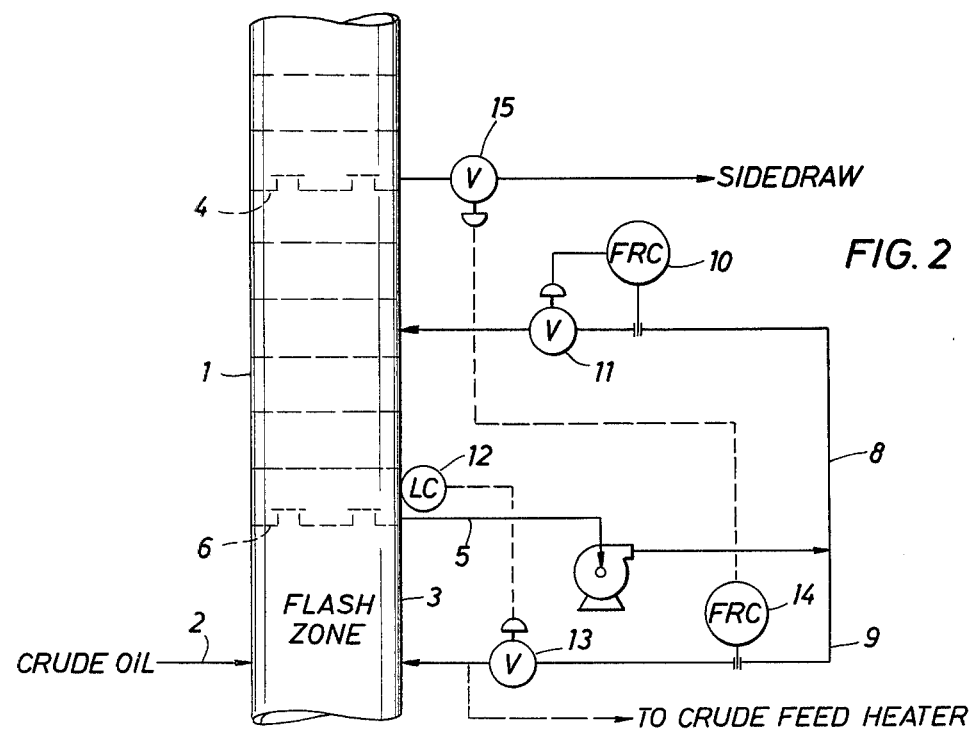

In order to describe the invention with greater detail, reference is made to the drawing. FIGS. 1 and 2 represent schematically the preferred manner of operation of the invention and a preferred manner of control of the liquid flows involved, respectively.

More particularly, preheated crude oil enters fractional distillation column (1) via line (2) where it is flashed in flash zone (3) to produce a vapor which is fractionated in the upper portion of the column. As shown, the trays below the lowest sidedraw tray (4) function as the de-entrainment section. In accordance with the invention, a withdrawal line (5) is provided at the first tray (6) above the flash zone (3). Liquid from tray (6) is drawn off in line 5 through pump 7 and returned to column 1 via line 8 to a location three trays higher in the column. The circulation rate is adjusted to provide adequate tray liquid for effective contacting and de-entrainment. At the same time, a small purge stream is taken from line 8 via line 9 to remove de-entrained black oil. The purge may be returned to the flash zone, as shown, or sent to the crude feed heater (dotted line). The upper two or more de-entrainment section trays are not in the circulating oil loop, and they function to remove entrainment from the circulating oil, which contains some black oil. (There is normally a small amount of liquid entrainment between trays in a distillation column.) Liquid flow on these trays is adequate for good tray action without recirculation.

Utilization of the invention has a number of distinct advantages. To begin with, distillate yield is increased. In the embodiment shown, the circulation loop purge is only 10–20% of the liquid flow required from the bottom tray of the de-entrainment section not having a circulation loop. The difference in these two flows is the increase in distillate yield (decrease in overflash) due to the circulation loop. As a result of the invention, distillate quality is improved. The lowest sidedraw product will contain less heavy ends (entrained black oil) by employing the circulation loop of the invention. Moreover, coke formation should be reduced in the de-entrainment section. There is a tendency for coke formation to occur on hot metal surfaces in the de-entrainment section, especially at the lower (hotter) trays in the section. The high liquid flows possible with a circulation loop reduce coke formation by more effective washing of the metal surfaces.

The invention provides improved thermal efficiency. The higher distillate yield means, conversely, a lower straight run residue yield. If the residue is further distilled in a vacuum flasher, as is the usual case, less flasher heater fuel will be required. Finally, if the straight run residue goes to a vacuum flasher, its operation will be improved in addition to the fuel saving mentioned since it will have a lower feed rate, less light ends in the feed, higher temperature of the topmost heat removal stream so heat recovery potential is improved, improved vacuum system operation, and improved flash distillate yield in flashers operating at a capacity constraint.

The preferred instrumentation for the circulating oil system is shown in FIG. 2. Similar numbers refer to corresponding elements.

In this discussion, it is assumed that operation of column 1, generally, is similar to that described above in relation to FIG. 1. To provide appropriate control, two flow rate controllers and a level control (or their computer analogues) are used. As shown, a sensor in line (8), in response to the flow rate in line (8), produces a signal which is compared with a pre-determined value in flow rate controller (10), and flow rate controller (10) operates valve (11) to maintain a desired rate of flow to column (1).

Simultaneously, since it similarly desirable to maintain a steady rate of flow in line 9, a sensor-flow rate controller-valve combination may be employed. Preferably, however, the flow of liquid to flash zone (3) is controlled in response to the liquid inventory on tray (6). More particularly, liquid level controller (12), in response to the level on tray (6), regulates valve (13), and thus the rate of flow to flash zone (3). The purge flow is controlled by adjusting the amount of liquid supplied to the de-entrainment zone, i.e., the liquid overflowing draw tray (4). Thus, in response to the rate of flow in line (9), flow rate controller (14) regulates valve (15), increasing or decreasing the flow of sidedraw liquid, and thereby decreasing or increasing the amount of liquid overflowing tray (4) into the de-entrainment zone.

As is apparent, while the invention has been illustrated with respect to particular apparatus, those skilled in the art will appreciate that other equivalent or analogous structures may be employed. Again, all pumps, valves, entry and exit lines, etc., have not been illustrated, as such expedients can readily be supplied by the skill of the art.

What is claimed is:

1. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid from the first tray above said flash zone as a liquid stream and returning at least the major portion of the liquid to the column to a zone higher in the column than said tray, but below the lowest sidedraw tray,
   (c) withdrawing additional condensed liquid from the first tray above the flash zone and returning at least the major portion of said additional liquid to the flash zone.

2. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid from the first tray above said flash zone as a liquid stream and returning at least the major portion of the liquid to the column to a zone higher in the column than said tray, but below the lowest sidedraw tray,
   (c) withdrawing additional condensed liquid from the first tray above the flash zone and returning at least the major portion of said additional liquid to the flash zone with the crude oil feed to column.

3. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid from the first tray above said flash zone as a liquid stream and returning at least the major portion of the liquid to the column to a zone higher in the column than said tray, but below the lowest sidedraw tray,
   (c) withdrawing condensed liquid from the liquid stream of step (b), and returning the condensed liquid to the flash zone.

4. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid from the first tray above said flash zone as a liquid stream and returning at least the major portion of the liquid to the column to a zone higher in the column than said tray, but below the lowest sidedraw tray,
   (c) withdrawing condensed liquid from the liquid stream of step (b), and returning the condensed liquid to the flash zone with the crude oil feed to the column.

5. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid from the first tray above said flash zone and returning at least the major portion of the liquid at a relatively constant rate to a zone higher in the column than said tray, but below the lowest sidedraw tray of the column,
   (c) withdrawing additional condensed liquid from the first tray above the flash zone in response to the level of liquid on said tray, and returning said liquid to the flash zone, and
   (d) regulating the rate of withdrawal of product from the lowest sidedraw tray in said column in response to the rate of removal of liquid in step (c).

6. The method of claim 5 where the liquid of step (c) withdrawn from the first tray above the flash zone is returned to the flash zone with the crude oil feed to the column.

7. A method for the fractional distillation of crude oil comprising:
   (a) vaporizing crude oil in the flash zone of a multiple tray fractional distillation column to produce a vapor which is fractionated in the upper sections of said column,
   (b) withdrawing condensed liquid in a recirculation line from the first tray above said flash zone and returning at least the major portion of the liquid at a relatively constant rate to the column to a zone higher in the column than said tray, but below the lowest sidedraw tray of the column,
   (c) withdrawing condensed liquid from said recirculation line in a purge line in response to the level of liquid on said tray, and returning said liquid to the flash zone,
   (d) regulating the rate of withdrawal of product from the lowest sidedraw tray in said column in response to the rate of flow of liquid in the purge line of step (c).

8. The method of claim 7 wherein the liquid of step (c) withdrawn from the purge line is returned to the flash zone with the crude oil feed to the column.

* * * * *